Oct. 27, 1936.   D. J. PURDIE   2,059,142
TELEMETRIC PROPORTIONING CONTROLLER
Filed June 2, 1934
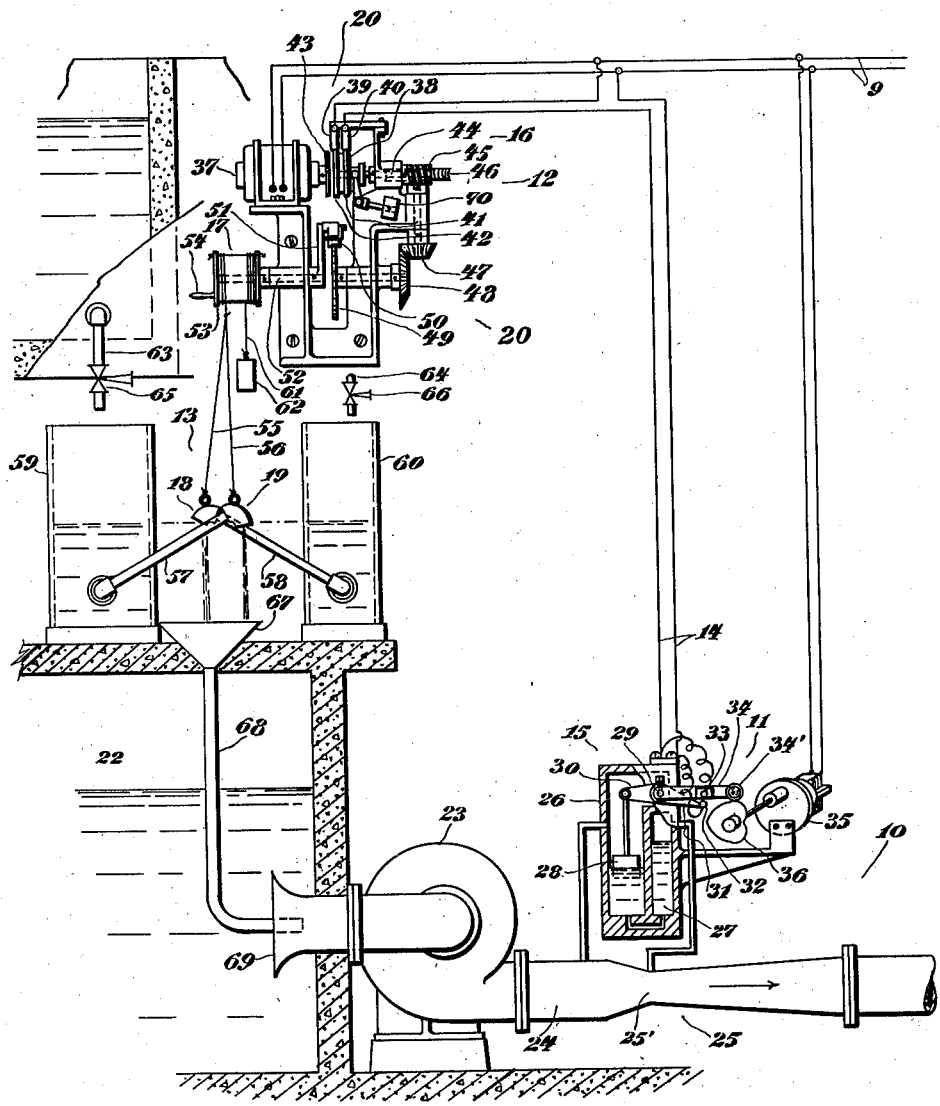
INVENTOR
David J. Purdie
BY Maxwell Barus
ATTORNEY Patented Oct. 27, 1936

2,059,142

UNITED STATES PATENT OFFICE 2,059,142

TELEMETRIC PROPORTIONING CONTROLLER

David J. Purdie, Verona, N. J., assignor to Builders Iron Foundry, Providence, R. I., a corporation of Rhode Island Application June 2, 1934, Serial No. 728,661

17 Claims. (Cl. 137—165)

My invention relates to improvements in proportioning controllers where one quantity is telemetrically controlled in correspondence to another quantity. My invention is particularly applicable where the master quantity is a fluid flowing in a conduit and the dependent quantity is another substance, whether a dry solid, a liquid, a vapor, or a gas.

Another object of my invention is to provide means for telemetrically governing the proportioning in a predetermined ratio with high accuracy by means of signals that are a function of time, so that the master and dependent quantities need not be near each other—a requirement that, in practice, often eliminates other proportioning controllers.

A further feature of my invention is to provide such a telemetrically operated controller with an integrator-type receiver for maintaining the average rate of the dependent quantity in a predetermined proportion to that of the master quantity.

Another object of my invention is to displace a member in such integrator-type of telemetric receiver through extents proportional to the time durations signalled to such a receiver. A specific object of my invention is to provide means for feeding an amount of chemical, whether in solid, liquid, or gaseous form, in proportion to the rate of the master quantity.

A specific object of my invention is to cyclically lower a level in a metering reservoir by an amount corresponding with the movement of the cyclically moving integrator and so feed in each cycle an amount corresponding with the rate of master fluid flow.

The drawing is a diagrammatic view, partially shown in section and partially shown in perspective, of an embodiment of my invention that shows a master flow telemetrically controlling a plurality of other flows by means of an integrator-type of governor for said dependent flows.

In the drawing, like characters of reference indicate like parts throughout: 10 metering means responsive to a master quantity, 11 telemetering means broadly for said quantity by means of a function of time, 12 governing means actuatable by said telemetric means to control dependent quantities by the control means 13 broadly shown. The telemetering means 11 consists of telemetric circuit means 14, transmitter means 15 actuated by said metering means 10 for metering said master quantity to produce signalling impulses in the circuit means 14 of a time duration corresponding to the rate of the master quantity metering. 16 is broadly telemetric receiver means cyclically responsive to said signal durations and hence corresponding to the quantity metered. Substantially synchronous motors 35 and 37 are preferably, and generally, attached to a common A. C. supply having the same regulated frequency at both transmitter and receiver to give the utmost accuracy of telemetering.

The governing means 12 broadly consists of means 17 operatively connecting the telemetric receiver means 16, responsive to the master quantity, with metering means 18 and 19 for said dependent quantities. The form of metering means and control means for the different rates may vary in different embodiments of my invention. The telemetric receiver means comprises integrator-type means 20.

As shown in the drawing, a quantity of liquid, generally water, is drawn from reservoir 22 and pumped through a centrifugal pump 23 through a conduit 24 having means 10 responsive to a master quantity, i. e., rate of water flow, consisting of a differential producer 25 shown throughout as a Venturi tube 25′ adapted to produce a pressure differential, hereafter "head", corresponding to the quantity-rate of flow of the water. Connected to the Venturi tube is a head responsive U-tube 26 having a manometric liquid, preferably mercury 27, therein and a float 28 positioned by one surface of said liquid. The displacement of this float 28 operates a shaft 29 to which are fixed two arms 30 and 31, one of which 30 is connected to the float 28 while the other 31 carries a contact 32. Cooperating with this contact 32 and adapted to rest thereon is a second contact 33 attached to a third arm 34 free to rotate on the same shaft 29 as the two arms 30 and 31 fixed thereto. A small, substantially synchronous motor 35 operates at constant speed to continuously rotate cam 36 at substantially constant speed. These parts are so arranged, and the cam 36 is so shaped, as to produce signalling impulses in telemetric circuit 14 attachable to said contacts 32 and 33.

The telemetric receiver 16 connectible to circuit 14 includes another small synchronous motor 37 operating continuously at substantially constant speed. A magnetically operable clutch means 38, attachable to said telemetric circuit 14 by means of brushes 39 and 40 and commutator rings 41 and 42, engages with a continuously rotating part 43 of the synchronous motor 37 to thus rotate shaft 44 through an angular extent corresponding to the time-duration of the signalling impulses. A worm 45 affixed to this shaft 44 rotates worm gear 46 and bevel gears 47 and 48 to rotate ratchet wheel 49 and pawl 50. This pawl 50 is attached to an arm 51 affixed to a shaft 52 on which is also attached a drum 53 having a handle 54 for manual operation, and cords 55 and 56 attached to the control means 13 comprising decantation pipes 57 and 58 for vertical, cylindrical metering tanks 59 and 60. Another cord 61 attached to the drum 53 has attached to its other end a counterweight 62 for said decantation pipes 57 and 58. Supply means 63 and 64 having manually operable valve means 65 and 66 are provided for replenishing the supply in the metering tanks when the level therein approaches the bottom of these tanks.

Funnel means 67 is shown for catching the flow from said decantation pipes 57 and 58 and has a pipe 68 for feeding the chemical into the suction 69 of the pump 23.

It is thus obvious that the operation of my embodiment shown in the drawing is as follows:

The water is pumped through the meter 25 at a rate suited to the demand. The flow through the Venturi tube 25' produces a pressure differential that in turn displaces the mercury 27 and float 28 in U-tube 26 thus positioning the contact arm 31. The constantly rotating cam 36 raises and lowers the upper contact arm 34 by means of the roller 34' attached to its outer end, so that the weight of the arm 34 causes the upper contact 33 to rest on the lower 32 for a period of time that depends upon the rate of flow of the water through the meter 25. This completes the telemetric circuit 14 and causes a signalling current to flow for the time-duration that these contacts 32 and 33 coact. The magnetic clutch 38, normally held in inoperative position by the counterweight 70, then engages the synchronous motor drive 43 for the duration of the signals, and thus, through the gear, shaft, and ratchet means provided, rotates the drum 53 through extents corresponding to the rate of water flow through the Venturi tube 25'.

It is also obvious that no positive work need be required to lower the decantation pipes attached to this drum by the cords 55 and 56, provided the pull on the counterweight cord 61 is slightly less than those of the decantation pipe cords 55 and 56. In other words, the irreversible worm 45 acts as a brake on the drum 53 that is permitted to turn only when the clutch 38 is turned by the motor 37. It is also obvious that when the decantation pipes draw near the bottom of their tanks, the drum 53 may be manually operated by the handle 54 to raise the decantation pipes 57 and 58 to their uppermost positions by slipping the pawl 50 on the ratchet wheel 49. Supply valves 65 and 66 are then manipulated to raise the level in the metering tanks 59 and 60 to that of the overflow in the decantation pipes 57 and 58. In normal operation, the chemical from the decantation pipes drops through the funnel 67 and the chemical supply pipe 68 into the suction 69 of the pump 23 so that the metered water at all times contains its predetermined proportion of chemical.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric proportioning system, the combination of means for cyclically telemetering signals of a function of time corresponding with the rate of delivery of a substance, including a receiver having a portion progressively movable from its initial positions for extents corresponding with said signals, and means progressively actuatable by said movable portion for corresponding extents and adapted to control a second substance in proportion to said rate.

2. In a telemetric proportioning system, the combination of means for telemetering a signal having a time-duration corresponding with the rate of delivery of a substance including an integrator-type receiver having a portion progressively movable at substantially constant speed from its initial position for a time and an extent corresponding with said signal duration, and means correspondingly and progressively actuatable by said movable portion for controlling a second substance.

3. In a telemetric proportioning system, the combination of means for telemetering the rate of delivery of a substance by signals having durations corresponding with said rate including a receiver adapted to integrate said rate and having a portion progressively movable for extents corresponding with said signal durations, and means progressively governed by said movable portion for controlling a second substance.

4. In a telemetric proportioning system, the combination of means for cyclically telemetering a master rate of delivery of a substance by signals of durations corresponding therewith, means operable by auxiliary power for controlling the rate of delivery of a second substance, and means governed by said telemetering means operatively connected to the second mentioned means for progressively controlling the actuation thereof corresponding with said signal durations.

5. In a telemetric proportioning system as set forth in claim 4, said second mentioned means being cyclically movable for extents corresponding with said signal durations and adapted to continuously cause delivery of said second substance at a substantially constant rate corresponding with the average of said actuating means movements.

6. In a telemetric proportioning system for a master fluid and dependent quantities, the combination of conduit means for conveying said master fluid quantity; telemetering means for said master quantity comprising operatively connected transmitting, circuit and receiving means, said transmitting means comprising means attached to said conduit and adapted to produce a differential pressure corresponding to the flow rate of said master quantity, pressure responsive means connected to said differential pressure producing means and having a portion responsive correspondingly with said differential pressure, said responsive portion having contact means operatively connected thereto and to said circuit to cyclically create signals in said circuit of a function of time corresponding with said master quantity flow rate; said receiving means having a portion progressively movable from its initial positions for extents corresponding with said signals; and means adapted to control said dependent quantity progressively operable by said receiving means movable portion for corresponding extents.

7. In a telemetric proportioning system for a master fluid and dependent quantities, the combination of conduit means for conveying said master fluid quantity and telemetering means for said master quantity comprising operatively connected transmitting, circuit and receiving means; said transmitting means comprising means attached to said conduit and adapted to produce a pressure differential corresponding to the flow rate of said master quantity, means connected to said differential pressure producing means and having a portion positionable to correspond with said pressure differential, said positionable portion having contact means operatively attached thereto and connected to said circuit to cyclically create signals in said circuit of a duration corresponding to said master quantity flow rate; and said receiver having integrating means progressively movable from its initial position in each cycle for an extent corresponding with said signal duration; and means governed by said receiver cyclically movable means to control said dependent quantity corresponding in a predetermined relation with said integrated signal durations and hence with said master quantity.

8. In a telemetric proportioning system, the combination of an integrator-type telemetric receiver having a portion progressively movable extents to correspond with a master quantity, a supply tank for a liquid, decantation means operatively connected to said supply tank, and means for connecting said decantation means to said receiver movable portion and adapted to lower said decantation means an extent corresponding with said receiver movable portion extents to correspondingly lower the level of said liquid in said supply tank by decanting an amount corresponding with the extent of lowering of said decantation means.

9. In a telemetric proportioning system as set forth in claim 8, said means for connecting said decantation means to said receiver progressively movable portion comprising an irreversible drive controlled in its actuation by said receiver movable portion.

10. In a telemetric proportioning system as set forth in claim 8, said means for connecting said decantation means to said receiver progressively movable portion including adjustable means for bringing said decantation means into operative relation with the surface of said liquid in said supply tank.

11. In a telemetric proportioning system as set forth in claim 8, said liquid supply tank and said decantation means being adapted to provide continuous flow of said liquid at a substantially constant rate corresponding with the average rate of lowering said decantation means.

12. In a telemetric proportioning system for cyclically telemetering a quantity by means of signals corresponding in duration with said quantity and controlling a liquid quantity in a predetermined proportion to said first quantity, the combination of a telemetric receiver having a shaft adapted to progressively move at substantially constant speed for said signals durations; a liquid supply tank; a decantation pipe, one end of which being swiveled to said tank and the other end of which being vertically displaceable; and means for operatively connecting said receiver shaft and said decantation pipe comprising a worm coaxially fixed on said shaft, a gear irreversibly drivable by said worm, a ratchet wheel connected with said gear, a pawl for said ratchet wheel, a pulley adjustably connectible with said ratchet wheel by said pawl, a cord attached to said pulley and to said decantation pipe vertically displaceable end, said decantation pipe being adapted to decant in each cycle an amount of said liquid from said supply tank proportional to said receiver shaft movement.

13. In a telemetric proportioning system, the combination of a telemetric receiver having a portion cyclically movable through extents corresponding to the rate of delivery of a substance, movable means controlling a second substance, and means operatively connecting said controlling means with said movable portion to progressively move said controlling means through extents corresponding with said movable portion extents.

14. In a telemetric system for proportioning one substance to another, the combination of means controlled by one of said substances for cyclically telemetering signals of a function of time corresponding with a quantity of said substance, said means including a receiver having a portion progressively movable from its initial positions for extents corresponding with said signals and hence with said quantity, and means actuatable by said movable portion for corresponding extents and adapted to control a second substance in proportion to said quantity.

15. In a telemetric system for proportioning one substance to another, the combination of means controlled by one of said substances for cyclically telemetering signals of time duration corresponding with a quantity of said substance, said means including a receiver having a portion progressively movable from its initial positions for extents corresponding with said signals and hence with said quantity, and means actuatable by said movable portion for corresponding extents and adapted to control a second substance in proportion to said quantity.

16. In a telemetric system for feeding a substance in proportion to the quantity rate of another, the combination of means controlled by the quantity rate of said other substance for cyclically telemetering signals of a function of time corresponding with said rate, said means including a receiver having a portion progressively movable from its initial positions for extents corresponding with said signals, means actuatable by said movable portion for corresponding extents and adapted to control the feeding of the first mentioned substance.

17. In a telemetric system for feeding a substance in proportion to the quantity rate of another, the combination of means controlled by the quantity rate of said other substance for cyclically telemetering signals of a time duration corresponding with said rate, said means including a receiver having a portion progressively movable from its initial positions for extents corresponding with said signals, means actuatable by said movable portion for corresponding extents and adapted to control the feeding of the first mentioned substance.

DAVID J. PURDIE.